United States Patent
Park

(10) Patent No.: US 8,964,836 B2
(45) Date of Patent: Feb. 24, 2015

(54) METHOD AND APPARATUS FOR SPATIAL PREDICTIVE ENCODING AND/OR DECODING OF VIDEO DATA

(75) Inventor: Gwang-hoon Park, Seongnam-si (KR)

(73) Assignees: Industry Academic Cooperation Foundation Kyunghee University, Youngin-si (KR); Samsung Electronics Co., Ltd., Suwon-si (KR)

( * ) Notice: Subject to any disclaimer, the term of this patent is extended or adjusted under 35 U.S.C. 154(b) by 2414 days.

(21) Appl. No.: 11/144,017

(22) Filed: Jun. 3, 2005

(65) Prior Publication Data

US 2005/0271141 A1 Dec. 8, 2005

(30) Foreign Application Priority Data

Jun. 3, 2004 (KR) .................. 10-2004-0040477

(51) Int. Cl.
*H04N 7/12* (2006.01)
*H04N 19/593* (2014.01)
*H04N 19/102* (2014.01)
*H04N 19/103* (2014.01)
*H04N 19/176* (2014.01)

(52) U.S. Cl.
CPC ............ *H04N 7/34* (2013.01); *H04N 7/26015* (2013.01); *H04N 7/26026* (2013.01); *H04N 7/26244* (2013.01)
USPC .................................................. 375/240.12

(58) Field of Classification Search
CPC .............................................. H04N 19/00042
USPC .............. 375/240.01, 240.12, 240.24, 240.26
See application file for complete search history.

(56) References Cited

U.S. PATENT DOCUMENTS

| | | | |
|---|---|---|---|
| 5,991,449 A | 11/1999 | Kimura et al. | |
| 6,148,109 A | 11/2000 | Shen et al. | |
| 2002/0131498 A1 | 9/2002 | Sun et al. | |
| 2003/0202588 A1 | 10/2003 | Yu et al. | |
| 2003/0223496 A1 | 12/2003 | Sun et al. | |
| 2004/0062445 A1 | 4/2004 | Kim et al. | |
| 2005/0265456 A1* | 12/2005 | Scheffler | 375/240.24 |
| 2007/0065030 A1 | 3/2007 | Shen et al. | |
| 2008/0247657 A1 | 10/2008 | Kalevo et al. | |

FOREIGN PATENT DOCUMENTS

| | | |
|---|---|---|
| CN | 1457196 A | 11/2003 |
| JP | 9-130810 A | 5/1997 |
| JP | 11-103463 A | 4/1999 |

(Continued)

OTHER PUBLICATIONS

Non-Final Rejection issued Oct. 21, 2010, in counterpart Korean Application No. 10-2004-0040477.

(Continued)

*Primary Examiner* — Young Lee
(74) *Attorney, Agent, or Firm* — Sughrue Mion, PLLC

(57) ABSTRACT

A method and apparatus for spatial predictive encoding and/or decoding of video data. The method for spatial predictive encoding of video data includes determining similarity among a plurality of previous data units that are adjacent to a current data unit, determining a reference data unit for spatial predictive encoding of the current data unit according to the determined similarity, and determining predicted values of pixels of the current data unit using pixel values of the reference data unit.

12 Claims, 9 Drawing Sheets

(56) References Cited

FOREIGN PATENT DOCUMENTS

| JP | 2001-204036 A | 7/2001 |
|---|---|---|
| JP | 2003-520531 A | 7/2003 |
| KR | 2003-0003222 A | 1/2003 |
| KR | 10-2003-0073120 A | 9/2003 |
| KR | 10-2003-0079872 A | 10/2003 |
| KR | 10-2004-0039805 A | 5/2004 |
| KR | 10-0871588 B1 | 11/2008 |

OTHER PUBLICATIONS

Office Action dated Feb. 1, 2011 from the Japanese Patent Office in Japanese counterpart application No. 2005-162843.

Jiang, G.-Y., et al., "An Efficient Fast Mode Selection for Intra Prediction", VLSI Design and Video Technology, 2005, pp. 357-360, XP 010833389.

Pan, F., et al., "Fast Mode Decision for Intra Prediction", Joint Video Team (JVT) of ISO/IEC MPEG & ITU-T VCEG (ISO/IEC JTC1SC29/WG11 and ITU-T SG16 Q.6), Mar. 2003, pp. 1-26, XP 030005677.

Partial European Search Report issued May 28, 2010 in counterpart European Application No. 05253381.7.

Bojun Meng et. al.: "Efficient intra-prediction Algorithm in H.264" Proceedings 2003 International Conference on Image Processing (Cat. No. 03CH37429), Barcelona, Spain, Sep. 14-17, 2003; [International Conference on Image Processing], IEEE Piscataway, NJ, USA, vol. 3, No. Sep. 14, 2003 pp. 837-840, XP010669964; ISBN: 978-0-7803-7750-9.

European search report dated Sep. 27, 2010, issued in corresponding European application No. 05253381.7.

Communication dated Jan. 9, 2012, issued by the Korean Intellectual Property Office in counterpart Korean Application No. 10-2004-0040477.

Communication dated Nov. 8, 2011, issued by the Japanese Patent Office in counterpart Japanese Application No. 2005-162843.

\* cited by examiner

METHOD AND APPARATUS FOR SPATIAL PREDICTIVE ENCODING AND/OR DECODING OF VIDEO DATA

This application claims priority from Korean Patent Application No. 10-2004-0040477, filed on Jun. 3, 2004, in the Korean Intellectual Property Office, the disclosure of which is incorporated herein in its entirety by reference.

BACKGROUND OF THE INVENTION

1. Field of the Invention

The present invention relates to spatial predictive encoding and decoding, and more particularly, to a method and apparatus for spatial predictive encoding and/or decoding of video data, which can more accurately perform spatial predictive encoding and/or decoding of video data.

2. Description of the Related Art

Since video data contains a large amount of data, compression encoding is essential for storage or transmission of video data. Encoding or decoding of video data is performed in data units such as macroblocks of 16×16 pixels or blocks of 8×8 pixels.

New video compression encoding standard called Motion Picture Experts Group (MPEG-4) Part 10 advanced video coding (AVC) or International Telecommunication Union Telecommunication Standardization Sector (ITU-T) H.264 has been established. In particular, AVC is developed to respond to transition from conventional circuit switching to packet switching service and various communication infrastructures, as new communication channels such as mobile communication networks are rapidly distributed.

AVC improves the encoding efficiency by 50% or more in comparison to existing standard MPEG-4 Part 2 visual codec and considers error robustness and network friendliness to cope with the rapidly changing wireless environment and Internet environment.

Intra spatial predictive encoding is a technique for compressing data of a current data unit using spatial correlation of video. More specifically, after pixel values of a current data unit are predicted using pixel values of at least one previous data unit that has correlation with the current data unit, a difference between actual pixel values of the current data unit and the predicted pixel values is entropy coded and then transmitted. Therefore, by performing intra spatial predictive encoding, the efficiency of data compression is improved when the actual pixel values are entropy coded and then transmitted.

FIG. 1 shows previous data units for intra spatial predictive encoding of a current data unit according to prior art. Referring to FIG. 1, for intra spatial predictive encoding of a current data unit E, previous data units A, B, C, and D are used. According to a conventional raster scan scheme, data units included in one image are scanned left-to-right and up-to-down. Thus, according to a conventional raster scan scheme, the previous data units A, B, C, and D are already scanned and encoded before the current data unit E. Since data units marked with X are not encoded, they cannot be used for predictive encoding of the current data unit E. Since data units marked with O have low correlation with the current data unit E, they are not used for predictive encoding of the current data unit E. After the previous data units are discrete cosine transformed (DCT) and quantized, they are inversely quantized and inversely DCT and are then reproduced.

According to AVC standard, Intra spatial predictive encoding is divided into intra 4×4 mode predictive encoding and intra 16×16 mode predictive encoding. In intra 4×4 mode predictive encoding, predictive encoding is performed in 4×4 subblock units. In intra 16×16 mode predictive encoding, predictive encoding is performed in 16×16 macroblock units.

Intra 16×16 mode predictive encoding will be described in more detail. Referring back to FIG. 1, when the data unit E is a current data unit to be coded, the previous data units A and B are used as reference data units for intra 16×16 mode predictive encoding. Also, all the pixel values of the previous data units A and B are not used for predictive encoding, but, as shown in FIG. 2, 16 pixel values V0 through V15 of pixels included in the right-most line of the previous data unit A and 16 pixel values H0 through H15 of pixels included in the bottom-most line of the previous data unit B are used for predictive encoding.

FIGS. 3A through 3D show four 16×16 intra predictive encoding modes according to MPEG-4 AVC. FIG. 3A shows a mode #0 called a vertical mode. When each actual pixel value of the current data unit E is P[x,y](x=0 . . . 15, y=0 . . . 15) and each predicted pixel value of the current data unit E is P[x,y](x=0 . . . 15, y=0 . . . 15), the predicted pixel value P[x,y] is determined using pixel values H0 through H15 of pixels included in the bottom-most line of the previous data unit B. In other words, as shown in FIG. 3A, P[x,y](x=0 . . . 15, y=0 . . . 15) is the same as one of H0 through H15 of pixels included in the same vertical line. For example, predicted pixel values included in the first vertical line of the current data unit are all H0 and predicted pixel values included in the second vertical line of the current data unit are all H1.

FIG. 3B shows a mode #1 called a horizontal mode. As shown in FIG. 3B, P[x,y](x=0 . . . 15, y=0 . . . 15) is the same as one of V0 through V15 of pixels included in the same horizontal line. For example, predicted pixel values included in the first horizontal line of the current data unit are all V0 and predicted pixel values included in the second horizontal line of the current data unit are all V1.

FIG. 3C shows a mode #2 called a DC mode. As shown in FIG. 3C, P[x,y](x=0 . . . 15, y=0 . . . 15) is a mean value of H0 through H15 and V0 through V15. If there exists the previous data unit A, but the previous data unit B does not exist, P[x,y](x=0 . . . 15, y=0 . . . 15) is a mean value of V0 through V15. If the previous data unit A does not exist, but the previous data unit B exists, P[x,y](x=0 . . . 15, y=0 . . . 15) is a mean value of H0 through H15. If neither the previous data unit A nor the previous data unit B exists, P[x,y](x=0 . . . 15, y=0 . . . 15) is set to a predetermined value like 128.

FIG. 3D shows a mode #3 called a plane mode. Referring to FIG. 3D, P[x,y](x=0 . . . 15, y=0 . . . 15) is determined in which predicted pixel values located on the left side of the diagonal line are determined using V0 through V15 and predicted pixel values located on the right side of the diagonal line are determined using H0 through H15. The mode #3 is useful for spatial prediction of video that gradually changes.

Video encoders that comply with AVC standards predictive encode a current macroblock in a plurality of modes of the intra 4×4 prediction mode and intra 16×16 prediction mode and then decide a prediction mode having the smallest value of a cost function. The cost function indicates the accuracy of predictive encoding and largeness and smallness of the amount of generated bit. As the cost function, there is a sum of absolute difference (SAD), a sum of absolute transformed difference (SATD), a sum of square difference (SSD), a mean of absolute difference (MAD), or a lagrange function.

Once one of the four 16×16 spatial predictive encoding modes is decided as a final prediction mode, the decided prediction mode is expressed with 2 bits and then coded using fixed length coding (FLC) or variable length coding (VLC).

However, the intra 16×16 prediction mode according to conventional AVC standards does not offer a sufficient number of modes for accurate spatial prediction.

SUMMARY OF THE INVENTION

The present invention provides a method and apparatus for intra spatial predictive encoding of video, which can perform more accurate spatial prediction without an increase in the amount of bit required for transmission of prediction mode information.

The present invention provides a method and apparatus for intra spatial predictive decoding of video, which can perform more accurate spatial prediction.

According to one aspect of the present invention, there is provided a method for spatial predictive encoding of video data, including: determining similarity among a plurality of previous data units that are adjacent to a current data unit; determining a reference data unit for spatial predictive encoding of the current data unit according to the determined similarity; and determining predicted values of pixels of the current data unit using pixel values of the reference data unit.

According to another aspect of the present invention, there is provided an apparatus for spatial predictive encoding of video data, including: a prediction controller determining similarity among a plurality of previous data units that are adjacent to a current data unit and determining a reference data unit for spatial predictive encoding of the current data unit according to the determined similarity; and a prediction unit determining predicted values of pixels of the current data unit using values of pixels of the reference data unit.

According to yet another aspect of the present invention, there is provided a method for spatial predictive decoding of video data, including: determining similarity among a plurality of previous data units that are adjacent to a current data unit; determining a reference data unit for spatial predictive decoding of the current data unit, according to the determined similarity; and determining predicted values of pixels of the current data unit using pixel values of the reference data unit.

According to yet another aspect of the present invention, there is provided an apparatus for spatial predictive decoding of video data, including: a prediction controller determining similarity among a plurality of previous data units that are adjacent to a current data unit and determining a reference data unit for spatial predictive encoding of the current data unit according to the determined similarity; and a prediction unit determining predicted values of pixels of the current data unit using values of pixels of the reference data unit.

BRIEF DESCRIPTION OF THE DRAWINGS

The above and other features and advantages of the present invention will become more apparent by describing in detail an exemplary embodiment thereof with reference to the attached drawings in which:

FIG. 1 shows a conventional raster scan scheme;

FIG. 2 shows pixels of reference data units used for a 16×16 intra predictive encoding mode prescribed in conventional MPEG-4 AVC;

DETAILED DESCRIPTION OF THE EXEMPLARY EMBODIMENTS OF THE INVENTION

In the present invention, to prevent an increase in the amount of bits required for transmission of prediction mode information, the same number of prediction modes as that of AVC 16×16 prediction modes, i.e., four prediction modes #0 through #3 are provided. Also, more accurate spatial prediction and a plurality of sub modes are provided. Data units used for predictive encoding are macroblocks in an embodiment of the present invention without being limited thereto and may be 8×8 blocks or 4×4 sub-blocks.

Four prediction modes according to the embodiment of the present invention include a mode #0 called a vertical/horizontal mode, a mode #1 called a DC mode, a mode #2 called a DC selection mode, and a mode #3 called a plane mode.

Figure 4A:
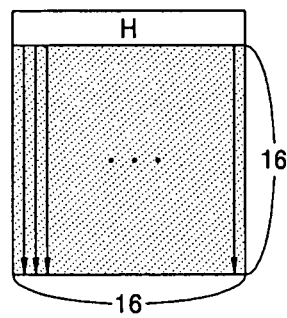
FIG. 4A shows a vertical sub mode according to an embodiment of the present invention.
Figure 4B:
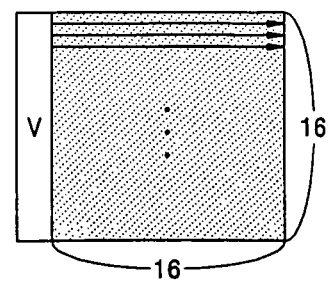
FIG. 4B shows a horizontal sub mode according to the embodiment of the present invention.

FIGS. 4A and 4B show the vertical/horizontal mode according to an embodiment of the present invention, in which FIG. 4A shows a vertical sub mode and FIG. 4B shows a horizontal sub mode.

H shown in FIG. 4A indicates a group of 16 pixel values H0 through H15 of pixels included in the bottom-most line of a previous data unit that is located up from a current data unit. V shown in FIG. 4B indicates a group of 16 pixel values V0 through V15 of pixels included in the right-most line of a previous data unit that is located on the left side of the current data unit. In the following description, H and V are used as indications described above.

Figure 3A:
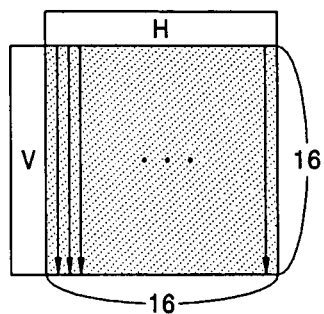
FIG. 3A shows a vertical mode prescribed in conventional MPEG-4 AVC.

When the previous data unit located on the left side of the current data unit to be predictive-encoded does not exist and the previous data unit located up from the current data unit to be predictive-encoded exists, pixel values of the current data unit are predicted in a vertical sub mode. A method for the determination is the same as that in the vertical mode described with reference to FIG. 3A.

Figure 3B:
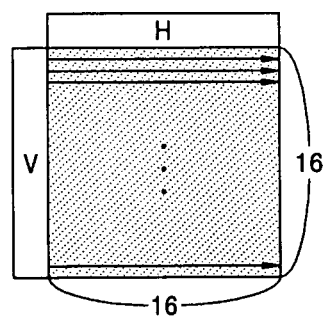
FIG. 3B shows a horizontal mode prescribed in conventional MPEG-4 AVC.
Figure 3C:
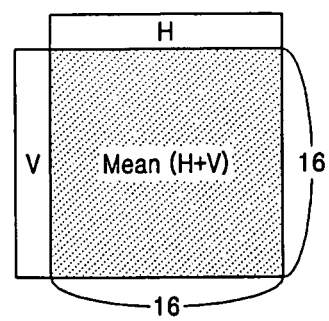
FIG. 3C shows a DC mode prescribed in conventional MPEG-4 AVC.
Figure 3D:
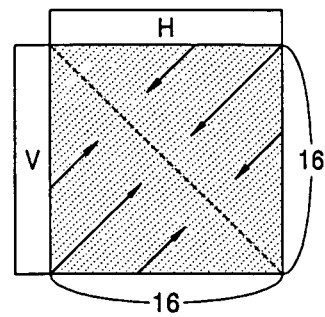
FIG. 3D shows a plane mode prescribed in conventional MPEG-4 AVC.

When the previous data unit located on the left side of the current data unit to be predictive-encoded exists and the previous data unit located up from the current data unit to be predictive-encoded does not exist, predicted values of pixels of the current data unit are determined in a horizontal sub mode. A method for the determination is the same as that in the horizontal mode described with reference to FIG. 3B.

A DC mode according to the embodiment of the present invention includes four sub modes, i.e., a full DC sub mode, a vertical DC sub mode, a horizontal DC sub mode, and an empty DC sub mode.

Figure 5A:
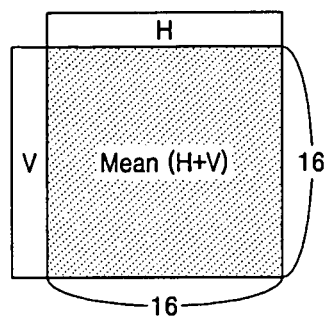
FIG. 5A shows a full DC mode according to the embodiment of the present invention.

FIG. 5A shows the full DC mode according to the embodiment of the present invention. When both the previous data unit located on the left side of the current data unit and the previous data unit located up from the current data unit exist, predicted values of pixels of the current data unit are determined in the full DC mode. In other words, all the predicted values of the pixels of the current data unit are the same as a mean value of H0 through H15 and V0 through V15.

Figure 5B:
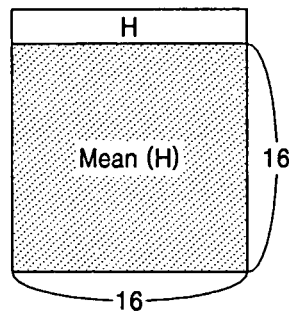
FIG. 5B shows a vertical DC sub mode according to the embodiment of the present invention.

FIG. 5B shows the vertical DC sub mode according to the embodiment of the present invention. When the previous data unit located on the left side of the current data unit does not exist and the previous data unit located up from the current data unit exists, predicted values of the pixels of the current data unit are determined in the vertical DC sub mode. In other words, all the predicted values of the pixels of the current data unit are the same as a mean value of H0 through H15.

Figure 5C:
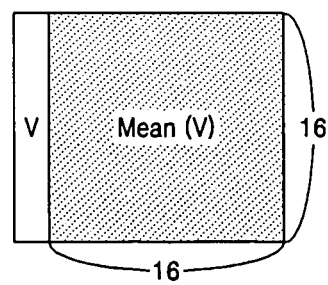
FIG. 5C shows a horizontal DC sub mode according to the embodiment of the present invention.

FIG. 5C shows the horizontal DC sub mode according to the embodiment of the present invention. When the previous data unit located on the left side of the current data unit exists and the previous data unit located up from the current data unit does not exist, predicted values of the pixels of the current data unit are determined in the horizontal DC sub mode. In other words, all the predicted values of the pixels of the current data unit are the same as a mean value of V0 through V15.

When neither the previous data unit located on the left side of the current data unit nor the previous data unit located up from the current data unit exists, all the predicted values of the pixels of the current data unit are set to a predetermined value like 128.

Figures 1, 2:
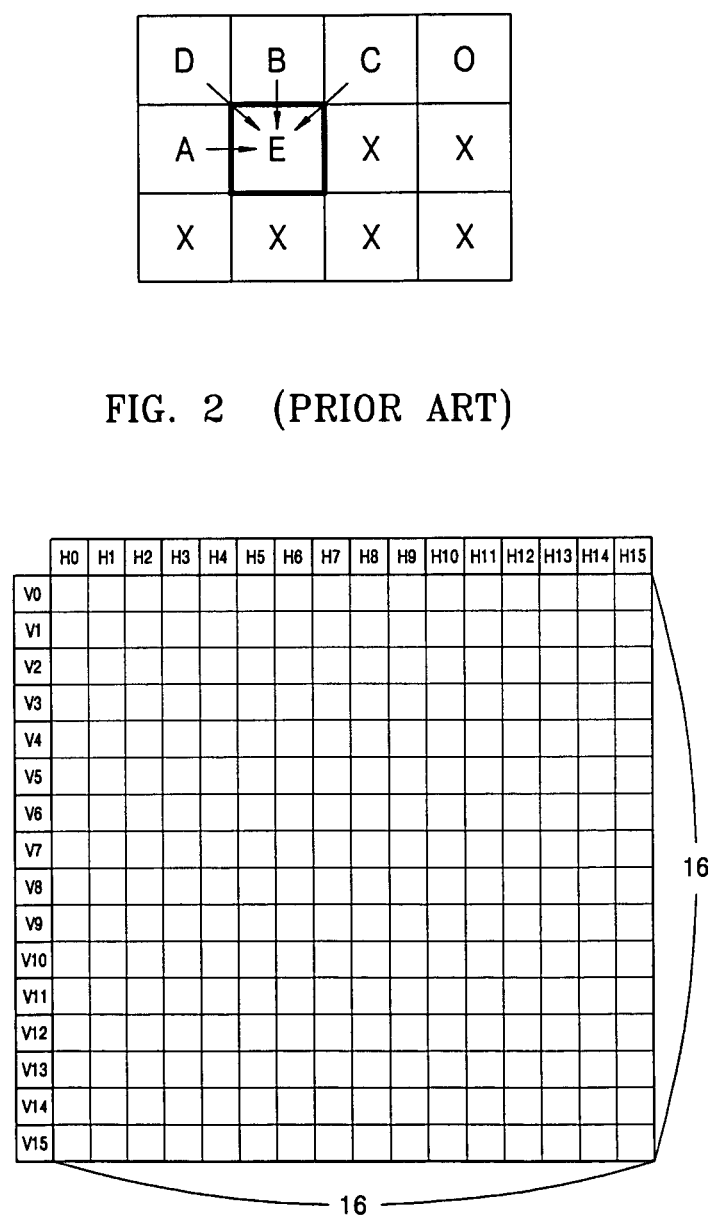

A DC selection mode according to the embodiment of the present invention includes two sub modes. As shown in FIG. 1, when the data unit E is a current data unit to be coded and previous data units adjacent to the current data unit E are A, B, C, and D, reference data units to be used for predictive encoding of the current data unit E are determined by determining similarity among the previous data units A, B, and D for predictive encoding of the current data unit E.

Figure 6A:
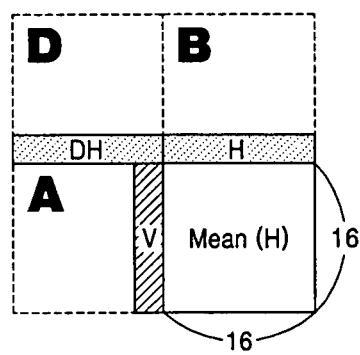
FIGS. 6A and 6B show sub modes of a DC selection mode according to the embodiment of the present invention.
Figure 6B:
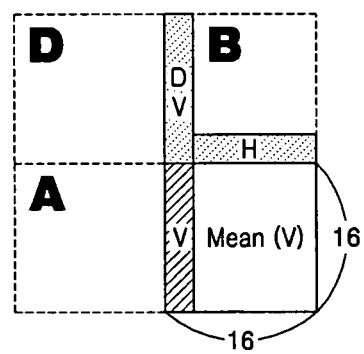

FIGS. 6A and 6B show the sub modes of the DC selection mode according to the embodiment of the present invention. If the video characteristic of the previous data unit D is similar to that of the previous data unit A, the previous data unit B is determined to be a reference data unit. If the previous data unit B is determined to be a reference data unit, all the predicted values of the pixels of the current data unit are the same as a mean value of H0 through H15.

If the video characteristic of the previous data unit D is similar to that of the previous data unit B, the previous data unit A is determined to be a reference data unit. If the previous data unit A is determined to be a reference data unit, all the predicted values of the pixels of the current data unit are the same as a mean value of V0 through V15.

Determination of similarity among previous data units can be performed in various ways. For example, a mean value of all the pixel values of each previous data unit is obtained and then the obtained mean values may be compared with one another.

Also, for determination of similarity among previous data units, a mean value of some of the pixel values of each previous data unit and then the obtained mean values may be compared with one another. For example, for determination of similarity between the previous data unit D and the previous data unit A, a mean value of 16 pixel values included in the bottom-most line DH of the previous data unit D and a mean value of V0 through V15 of the previous data unit A may be compared. Also, for determination of similarity between the previous data unit D and the previous data unit B, a mean value of 16 pixel values included in the right-most line DV of the previous data unit D and a mean value of H0 through H15 of the previous data unit B may be compared.

The plane mode according to the embodiment of the present invention is the same as the plane mode of AVC that is already described and will not be described in detail.

Figure 7:
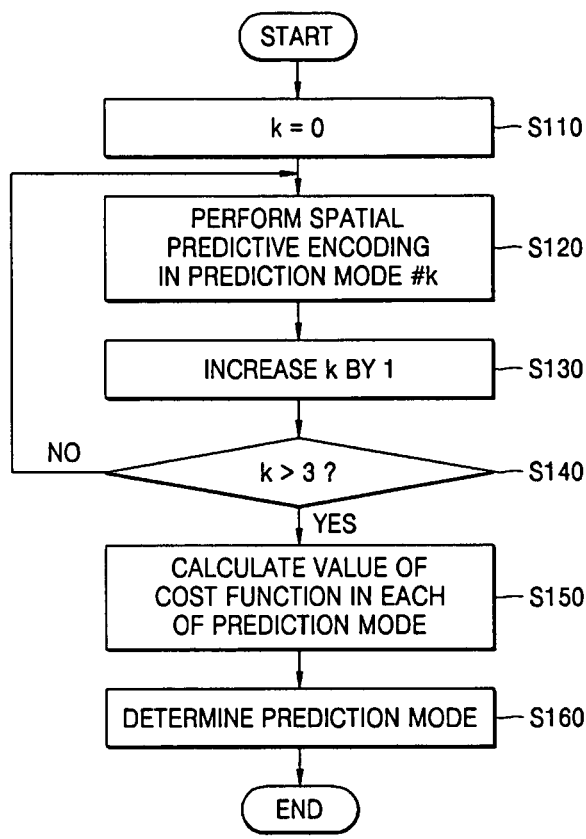
FIG. 7 is a flowchart illustrating a method for spatial predictive encoding according to the embodiment of the present invention.

FIG. 7 is a flowchart illustrating a method for spatial predictive encoding according to the embodiment of the present invention. In operation S110, k indicating a spatial prediction mode is initially set to 0. The prediction mode according to the embodiment of the present invention includes, as described above, four modes, i.e., the mode #0 called the vertical/horizontal mode, the mode #1 called the DC mode, the mode #2 called the DC selection mode, and the mode #3 called the plane mode. However, in addition to the four modes, other prediction modes may be added for intra spatial predictive encoding of the current data unit. Also, at least one may be taken off the four modes. In other words, inclusion of the four modes is not essential for intra spatial predictive encoding of the current data unit.

Through operations S120 through S140, in each prediction mode, spatial predictive encoding of the current data unit is performed using at least one previous data unit that is adjacent to the current data unit.

Once spatial predictive encoding of the current data unit is completed in the four prediction modes, a value of a predetermined cost function, which corresponds to a result of the spatial predictive encoding in each prediction mode, is calculated in operation S150.

The cost function indicates the accuracy of predictive encoding and largeness and smallness of the amount of generated bits. As the cost function, there is a sum of absolute difference (SAD), a sum of absolute transformed difference (SATD), a sum of square difference (SSD), a mean of absolute difference (MAD), or a lagrange function. For example, when the SAD is used as the cost function, P[x,y] is an actual pixel value of the current data unit that is not yet encoded, and P[x,y] is a predicted pixel value of the current data unit, the cost function is defined as follows.

$$SAD = Sum_{x=0\ldots15, y=0\ldots15} |P[x,y] - P'[x,y]|$$

After the value of the cost function, which corresponds to the result of the spatial predictive encoding in each prediction mode, is calculated, a prediction mode having the smallest value of the cost function is determined to be a prediction mode of the current data unit in operation S150. Since the cost function generally indicates the degree of difference between the actual pixel value and the predicted pixel value, the prediction mode having the smallest value of the cost function can be determined to be most accurate and efficient for spatial predictive encoding.

Figure 8:
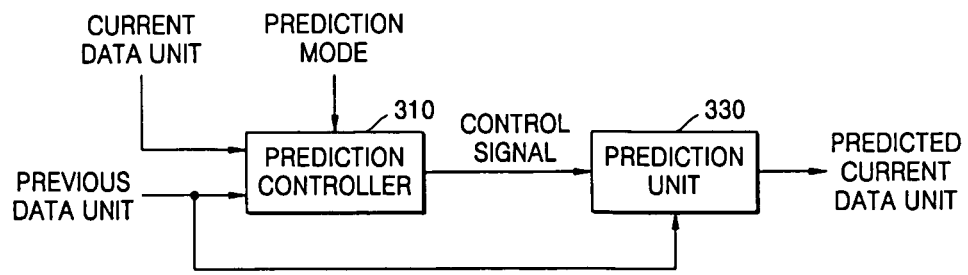
FIG. 8 is a block diagram of an apparatus for spatial predictive encoding according to the embodiment of the present invention.

A method for spatial predictive encoding in each prediction mode will be described in more detail. FIG. 8 is a block diagram of an apparatus for spatial predictive encoding according to the embodiment of the present invention. Referring to FIG. 8, the apparatus for spatial predictive encoding includes a prediction controller 310 and a prediction unit 330.

The pixel values included in the current data unit, the pixel values of the previous data units, and prediction mode information are input to the prediction controller 310. The pixel values included in the current data unit are the actual pixel values of the current data unit that is not yet encoded, and the pixel values of the previous data units are reproduced pixel values after undergoing encoding and decoding in a predetermined manner. The prediction controller 310 determines which sub mode among sub modes included in the input prediction mode information is to be applied to prediction of the prediction unit 330 and then controls the operation of the prediction unit 330.

The prediction unit 330 outputs predicted values of pixels of the current data unit under the control of the prediction controller 310.

Spatial prediction encoding in the mode #0 called the vertical/horizontal mode among the four prediction modes according to the embodiment of the present invention will be described.

Once the prediction mode #0 is input to the prediction controller 310, the prediction controller 310 determines whether the previous data unit located on the left side of the current data unit to be predictive-coded and the previous data unit located up from the current data unit to be predictive-coded exist. If the previous data unit located on the left side of the current data unit does not exist and the previous data unit located up from the current data unit exists, the prediction controller 310 controls the prediction unit 330 in such a way that the prediction unit 330 determines predicted values of the pixels of the current data unit in the vertical sub mode as described above.

If the previous data unit located on the left side of the current data unit exists and the previous data unit located up from the current data unit does not exist, the prediction controller 310 controls the prediction unit 330 in such a way that the prediction unit 330 determines predicted values of the pixels of the current data unit in the horizontal sub mode as described above.

If neither the previous data unit located on the left side of the current data unit nor the previous data unit located up from the previous data unit exists, spatial prediction encoding in the prediction mode #0 is not performed.

Figure 9:
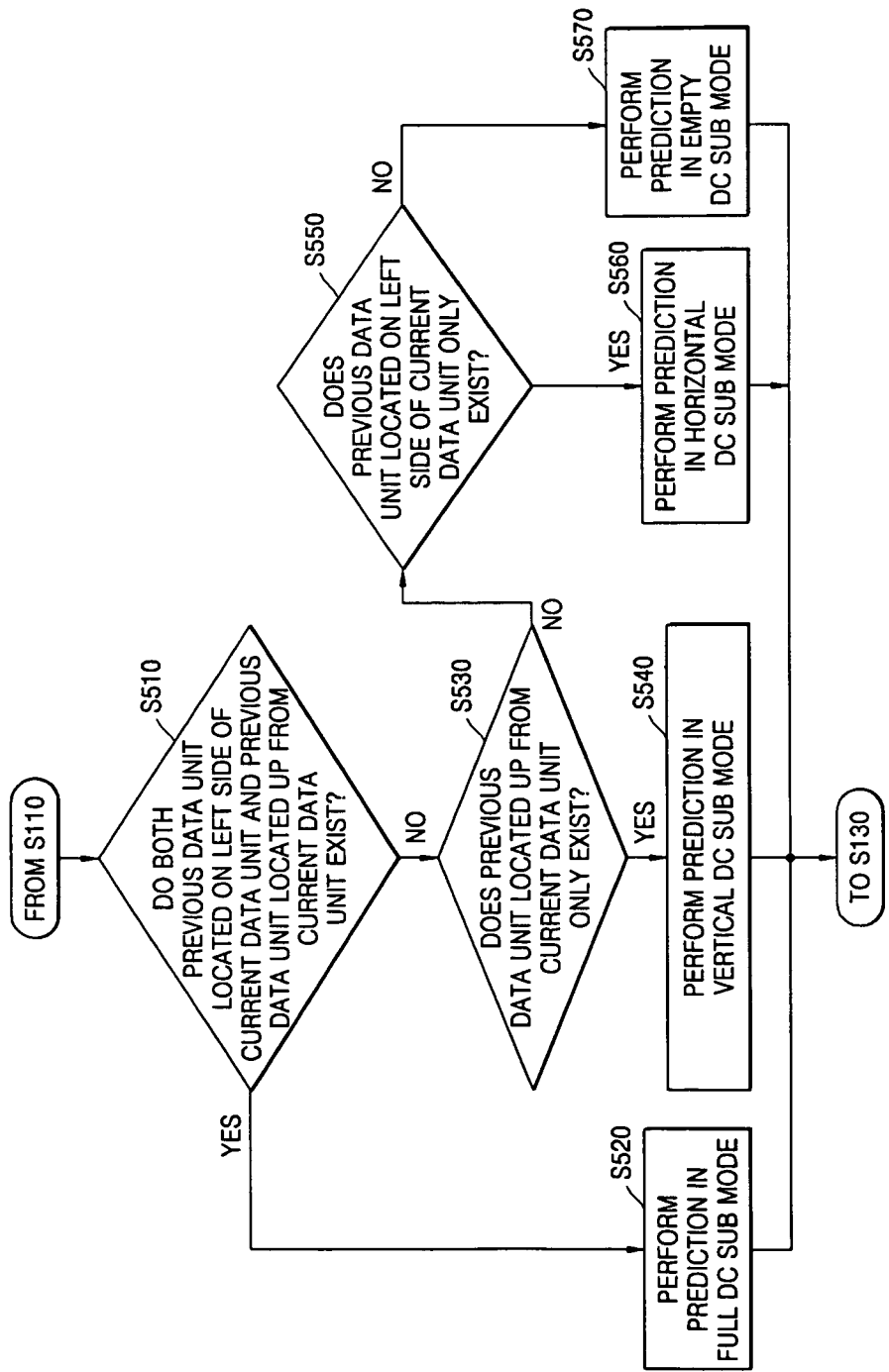
FIG. 9 is a flowchart illustrating a method for spatial predictive encoding in a DC mode according to the embodiment of the present invention.

Next, a method for spatial predictive encoding in the DC mode will be described. FIG. 9 is a flowchart illustrating a method for spatial predictive encoding in the DC mode according to the embodiment of the present invention.

Once the prediction mode #1 is input to the prediction controller 310, the prediction controller 310 determines whether the previous data unit located on the left side of the current data unit to be predictive-encoded and the previous data unit located up from the current data unit to be predictive-encoded exist, in operation S510.

If both the previous data unit located on the left side of the current data unit and the previous data unit located up from the current data unit exist, the prediction controller 310 controls the prediction unit 330 in such a way that the prediction unit 330 determines predicted values of the pixels of the current data unit in the full DC mode as described above, in operation S520.

If the previous data unit located on the left side of the current data unit does not exist and the previous data unit located up from the current data unit exists, the prediction controller 310 controls the prediction unit 330 in such a way that the prediction unit 330 determines predicted values of the pixels of the current data unit in the vertical DC sub mode as described above, in operation S540.

If the previous data unit located on the left side of the current data unit exists and the previous data unit located up from the current data unit does not exist, the prediction controller 310 controls the prediction unit 330 in such a way that the prediction unit 330 determines predicted values of the pixels of the current data unit in the horizontal DC sub mode as described above, in operation S560.

If neither the previous data unit located on the left side of the current data unit nor the previous data unit located up from the current data unit exists, the prediction controller 310 controls the prediction unit 330 in such a way that the prediction unit 330 determines predicted values of the pixels of the current data unit to a predetermined value like 128, in operation S570.

Figure 10:
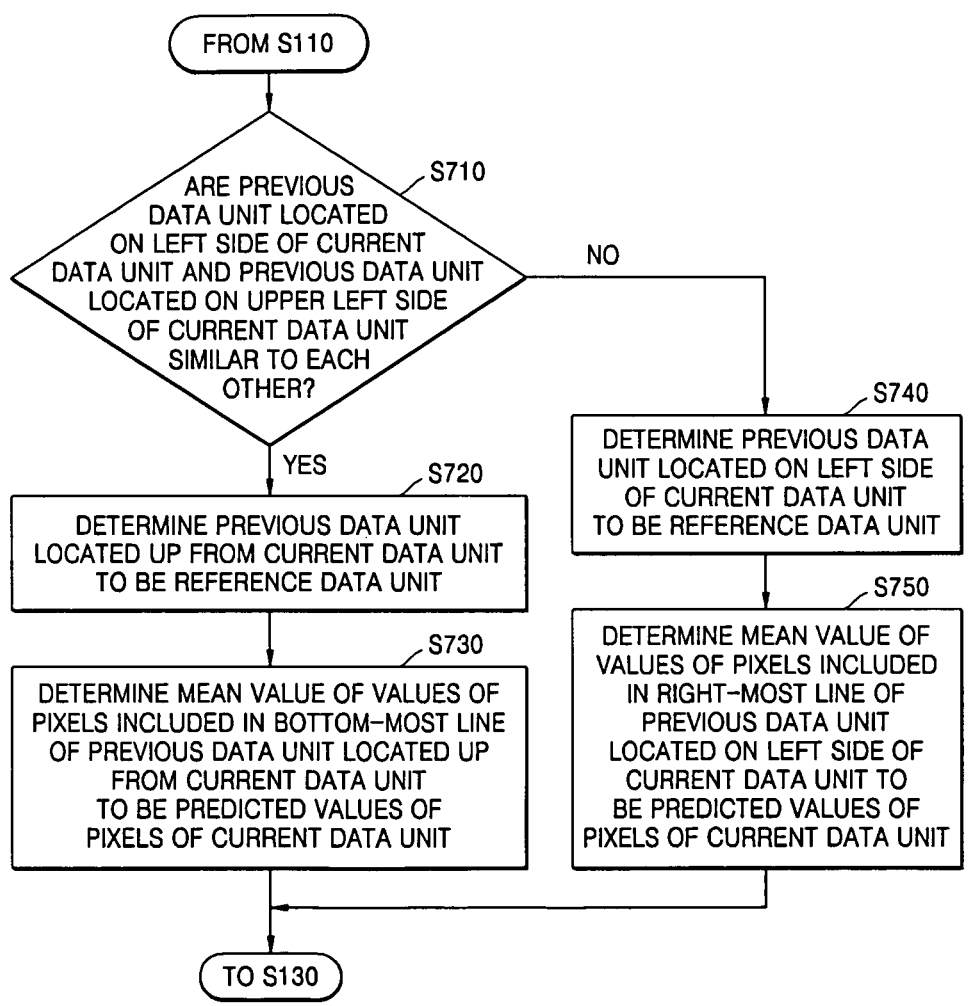
FIG. 10 is a flowchart illustrating a method for spatial predictive encoding in a DC selection mode according to the embodiment of the present invention.

Next, a method for spatial predictive encoding in the DC selection mode will be described. FIG. 10 is a flowchart illustrating a method for spatial predictive encoding in the DC selection mode according to the embodiment of the present invention.

As shown in FIG. 1, when the data unit E is the current data unit to be encoded and the previous data units adjacent to the current data unit E are A, B, C, and D, once the prediction mode #2 is input to the prediction controller 310, the prediction controller 310 determines similarity among the previous data units A, B, and D to determine reference data units that are to be used for predictive encoding of the current data unit E.

Referring to FIG. 10, in the first operation S710, the prediction controller 310 determines whether the video characteristic of the previous data unit D is similar to that of the previous data unit A. If the video characteristic of the previous data unit D is similar to that of the previous data unit A, the prediction controller 310 determines the previous data unit B to be a reference data unit in operation S720. If the previous data unit B is determined to be a reference data unit, predicted values of the pixels of the current data unit E, which are output from the prediction unit 330, are the same as a mean value of H0 through H15 of pixels included in the bottom-most line of the previous data unit B under the control of the prediction controller 310, in operation S730.

If the video characteristic of the previous data unit D is similar to that of the previous data unit B, the prediction controller 310 determines the previous data unit A to be a reference data unit in operation S740. If the previous data unit A is determined to be a reference data unit, predicted values of the pixels of the current data unit E, which are output from the prediction unit 330, are the same as a mean value of V0 through V15 of pixels included in the right-most line of the previous data unit A under the control of the prediction controller 310 in operation S750.

Determination of similarity among previous data units can be performed in various ways. For example, a mean value of all the pixel values of each previous data unit is obtained and then the obtained mean values may be compared with one another.

Also, for determination of similarity among previous data units, a mean value of some of the pixel values of each previous data unit and then the obtained mean values may be compared with one another. For example, for determination of similarity between the previous data unit D and the previous data unit A, a mean value of 16 pixel values included in the bottom-most line DH of the previous data unit D and a mean value of V0 through V15 of the previous data unit A may be compared. Also, for determination of similarity between the previous data unit D and the previous data unit B, a mean value of 16 pixel values included in the right-most line DV of the previous data unit D and a mean value of H0 through H15 of the previous data unit B may be compared.

The plane mode according to the embodiment of the present invention is the same as the plane mode of AVC that is already described and will not be described in detail.

Hereinafter, a method for spatial predictive decoding of video data according to the embodiment of the present invention will be described. The method for spatial predictive decoding of video data according to the embodiment of the present invention performs spatial predictive encoding of video data that is encoded using the above-described method for spatial predictive encoding according to the embodiment of the present invention.

Figure 11:
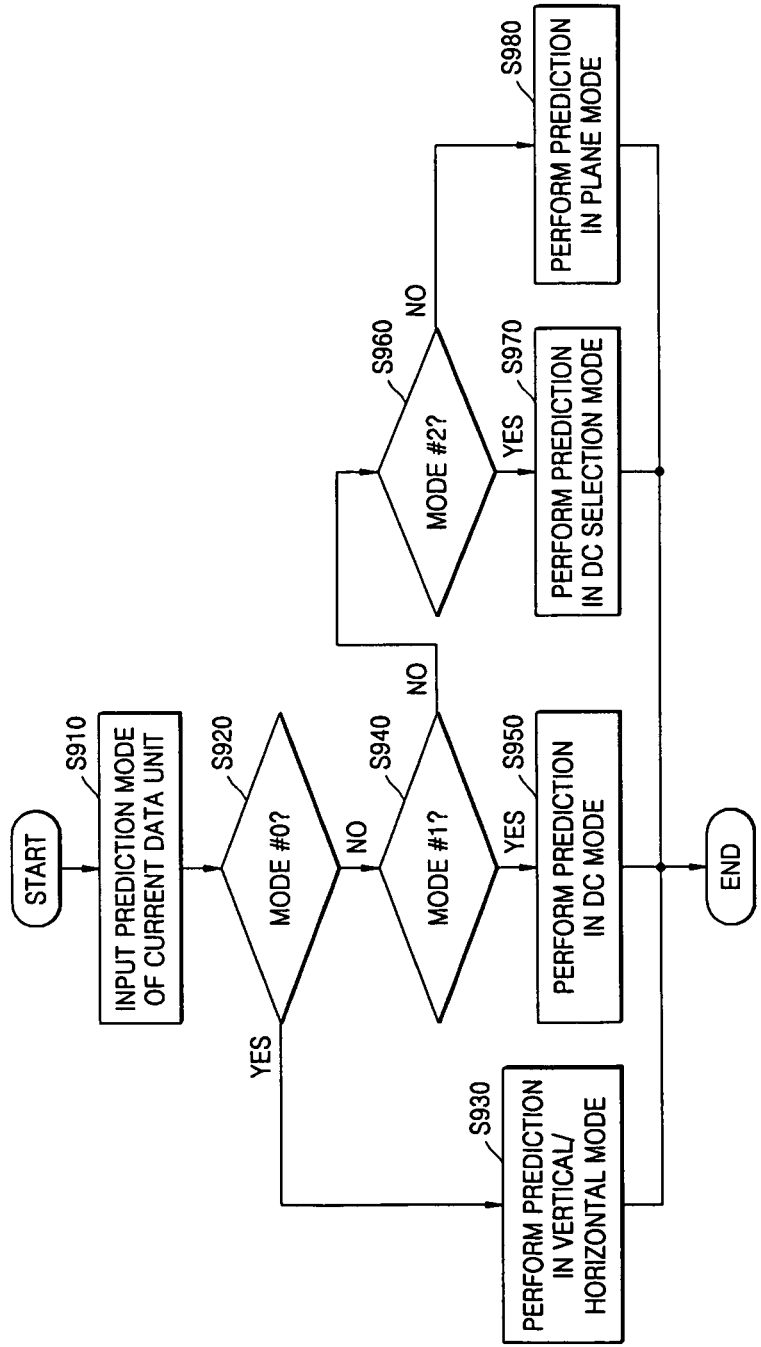
FIG. 11 is a flowchart illustrating a method for spatial predictive decoding according to the embodiment of the present invention.

FIG. 11 is a flowchart illustrating the method for spatial predictive decoding of video data according to the embodiment of the present invention. A video decoder (not shown) receives prediction mode information indicating in which mode among the four prediction modes a current data unit to be spatial predictive-decoded is predicted, in operation S910. The prediction modes according to the embodiment of the present invention includes, as described above, the four modes, i.e., the mode #0 called the vertical/horizontal mode, the mode #1 called the DC mode, the mode #2 called the DC selection mode, and the mode #3 called the plane mode. In addition to the four modes, other prediction modes may be added for intra spatial predictive encoding of the current data unit. Also, at least one may be taken off the four modes. In other words, inclusion of the four modes is not essential for intra spatial predictive encoding of the current data unit.

Once intra spatial prediction mode information that undergoes FLC or VLC is decoded and a prediction mode used in an encoder is determined, the decoder obtains predicted values of pixels of the previous data unit in the same manner as in the intra spatial prediction mode used in the encoder.

If the prediction mode used for the current data unit is the prediction mode #0, spatial prediction is performed in the vertical/horizontal mode in operation S930. If the prediction mode used for the current data unit is the prediction mode #1, spatial prediction is performed in the DC mode in operation S950. If the prediction mode used for the current data unit is the prediction mode #2, spatial prediction is performed in the DC mode in operation S970. If the prediction mode used for the current data unit is the prediction mode #3, spatial prediction is performed in the DC mode in operation S980.

Since the decoder obtains the predicted values of the pixels of the current data unit in the same manner as in the intra spatial prediction mode used in the encoder, a method for spatial prediction of the current data unit in each of the prediction modes has already been described and will not be repeated. Also, the apparatus for spatial predictive decoding of video data according to the embodiment of the present invention has a configuration that is the same as that of the apparatus for spatial predictive encoding of video data according to the embodiment of the present invention, shown in FIG. 8.

As described above, according to the embodiment of the present invention, sub prediction modes are included in each of spatial prediction modes, but it is not necessary to transmit information about the sub prediction modes. As a result, it is possible to improve the accuracy of spatial prediction of video data without an increase in the amount of data required for transmission of prediction mode information, when compared to conventional art.

Meanwhile, the present invention can also be embodied as a computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A method for spatial predictive encoding of video data, comprising:
    selecting a first prediction mode from a plurality of modes;
    when a prediction is executed based on the selection of the first prediction mode, selecting for execution only one sub-mode from at least two sub-modes, said selecting of the sub-mode comprises:
    determining by a computer similarity among a plurality of previous data units that are adjacent to a current data unit, according to the first prediction mode;
    determining a reference data unit for spatial predictive encoding of the current data unit according to the determined similarity; and
    determining predicted values of pixels of the current data unit using pixel values of the reference data unit, according to the first prediction mode,
    wherein the first prediction mode is a DC selection mode in which a mean value of horizontal and vertical lines included in two data units among the plurality of previous data units is determined and the similarity is determined by comparing the mean values of horizontal and vertical lines,
    wherein the plurality of previous data units includes a first data unit that is located on the left side of the current data unit, a second data unit that is located up from the current data unit, and a third data unit that is located on the upper left side of the current data unit,
    wherein in the determination of the reference data unit, if the first data unit and the third data unit are similar to each other, the second data unit is determined to be the reference data unit, and if the second data unit and the third data unit are similar to each other, the first data unit is determined to be the reference data unit, and
    wherein the similarity between the first data unit and the third data unit is determined by comparing a mean value of values of pixels included in the right-most line of the first data unit and a mean value of values of pixels included in the bottom-most line of the third data unit and the similarity between the second data unit and the third data unit is determined by comparing a mean value of values of pixels included in the bottom-most line of the second data unit and a mean value of values of pixels included in the right-most line of the third data unit.

2. The method of claim 1, wherein in the determination of the predicted values of the pixels of the current data unit, if the first data unit is determined to be the reference data unit, the mean value of the values of the pixels included in the right-most line of the first data unit is determined to be the predicted values of the pixels of the current data unit, and if the second data unit is determined to be the reference data unit, a mean value of the values of the pixels included in the bottom-most line of the second data unit is determined to be the predicted values of the pixels of the current data unit.

3. The method of claim 1, wherein the first predication mode is a DC selection mode, which is one of a plurality of modes, and wherein the DC selection mode comprises at least two sub-modes.

4. The method of claim 1, further comprising: selecting the first prediction mode based on a value of a calculated cost function for the first prediction mode.

5. An apparatus for spatial predictive encoding of video data, comprising:
   a first prediction controller selecting a first prediction mode from a plurality of modes; and when a prediction is executed based on the selection of the first prediction mode, selecting for execution only one sub-mode from at least two sub-modes, said selecting of the sub-mode comprises: determining similarity among a plurality of previous data units that are adjacent to a current data unit and determining a reference data unit for spatial predictive encoding of the current data unit according to the determined similarity, according to the first prediction mode; and
   a first prediction unit determining predicted values of pixels of the current data unit using values of pixels of the reference data unit, according to the first prediction mode,
   wherein the first prediction mode is a DC selection mode in which a mean value of horizontal and vertical lines included in two data units among the plurality of previous data units is determined and the similarity is determined by comparing the mean values of horizontal and vertical lines,
   wherein the plurality of previous data units includes a first data unit that is located on the left side of the current data unit, a second data unit that is located up from the current data unit, and a third data unit that is located on the upper left side of the current data unit,
   wherein if the first data unit and the third data unit are similar to each other, the first prediction controller determines the second data unit to be the reference data unit, and if the second data unit and the third data unit are similar to each other, the first prediction controller determines the first data unit to be the reference data unit, and
   wherein the first prediction controller determines the similarity between the first data unit and the third data unit by comparing a mean value of values of pixels included in the right-most line of the first data unit and a mean value of values of pixels included in the bottom-most line of the third data unit and determines the similarity between the second data unit and the third data unit by comparing a mean value of values of pixels included in the bottom-most line of the second data unit and a mean value of values of pixels included in the right-most line of the third data unit.

6. The apparatus of claim 5, wherein if the first data unit is determined to be the reference data unit, the prediction unit determines the mean value of the values of the pixels included in the right-most line of the first data unit to be the predicted values of the pixels of the current data unit, and if the second data unit is determined to be the reference data unit, the prediction unit determines a mean value of the values of the pixels included in the bottom-most line of the second data unit to be the predicted values of the pixels of the current data unit.

7. A method for spatial predictive decoding of video data, comprising:
   selecting a first prediction mode from a plurality of modes;
   when a prediction is executed based on the selection of the first prediction mode, selecting for execution only one sub-mode from at least two sub-modes, said selecting of the sub-mode comprises:
   determining by a computer similarity among a plurality of previous data units that are adjacent to a current data unit, according to a first prediction mode;
   determining a reference data unit for spatial predictive decoding of the current data unit, according to the determined similarity; and
   determining predicted values of pixels of the current data unit using pixel values of the reference data unit, according to the first prediction mode,
   wherein the first prediction mode is a DC selection mode in which a mean value of horizontal and vertical lines included in two data units among the plurality of previous data units is determined and the similarity is determined by comparing the mean values of horizontal and vertical lines,
   wherein the plurality of previous data units includes a first data unit that is located on the left side of the current data unit, a second data unit that is located up from the current data unit, and a third data unit that is located on the upper left side of the current data unit,
   wherein in the determination of the reference data unit, if the first data unit and the third data unit are similar to each other, the second data unit is determined to be the reference data unit, and if the second data unit and the third data unit are similar to each other, the first data unit is determined to be the reference data unit, and
   wherein the similarity between the first data unit and the third data unit is determined by comparing a mean value of values of pixels included in the right-most line of the first data unit and a mean value of values of pixels included in the bottom-most line of the third data unit and the similarity between the second data unit and the third data unit is determined by comparing a mean value of values of pixels included in the bottom-most line of the second data unit and a mean value of values of pixels included in the right-most line of the third data unit.

8. The method of claim 7, wherein in the determination of the predicted values of the pixels of the current data unit, if the first data unit is determined to be the reference data unit, the mean value of the values of the pixels included in the right-most line of the first data unit is determined to be the predicted values of the pixels of the current data unit, and if the second data unit is determined to be the reference data unit, a mean value of the values of the pixels included in the bottom-most line of the second data unit is determined to be the predicted values of the pixels of the current data unit.

9. An apparatus for spatial predictive decoding of video data, comprising:
   a first prediction controller selecting a first prediction mode from a plurality of modes; when a prediction is executed based on the selection of the first prediction mode, selecting for execution only one sub-mode from at least two sub-modes, said selecting of the sub-mode comprises: determining similarity among a plurality of previous data units that are adjacent to a current data unit and determining a reference data unit for spatial predictive encoding of the current data unit according to the determined similarity, according to a first prediction mode; and a first prediction unit determining predicted values of pixels of the current data unit using values of pixels of the reference data unit, according to the first prediction mode, the first prediction mode is a DC selection mode in which a mean value of horizontal and vertical lines included in two data units among the plurality of previous data units is determined and the similarity is determined by comparing the mean values of horizontal and vertical lines, wherein the plurality of previous data units includes a first data unit that is located on the left side of the current data unit, a second data unit that is located up from the current data unit, and a third data unit that is located on the upper left side of the current data unit, wherein if the first data unit and the third data unit are similar to each other, the first prediction controller determines the second data unit to be the reference data unit, and if the second data unit and the third data unit are similar to each other, the first prediction controller determines the first data unit to be the reference data unit, and wherein the first prediction controller determines the similarity between the first data unit and the third data unit by comparing a mean value of values of pixels included in the right-most line of the first data unit and a mean value of values of pixels included in the bottom-most line of the third data unit and determines the similarity between the second data unit and the third data unit by comparing a mean value of values of pixels included in the bottom-most line of the second data unit and a mean value of values of pixels included in the right-most line of the third data unit.

10. The apparatus of claim 9, wherein if the first data unit is determined to be the reference data unit, the first prediction unit determines the mean value of the values of the pixels included in the right-most line of the first data unit to be the predicted values of the pixels of the current data unit, and if the second data unit is determined to be the reference data unit, the prediction unit determines a mean value of the values of the pixels included in the bottom-most line of the second data unit to be the predicted values of the pixels of the current data unit.

11. A non-transitory computer-readable recording medium having recorded thereon a program for implementing a method for spatial predictive encoding of video data, the method comprising:

selecting a first prediction mode from a plurality of modes:

when a prediction is executed based on the selection of the first prediction mode, selecting for execution only one sub-mode from at least two sub-modes, said selecting of the sub-mode comprises:

determining similarity among a plurality of previous data units that are adjacent to a current data unit, according to the first prediction mode;

determining a reference data unit for spatial predictive encoding of the current data unit according to the determined similarity; and determining predicted values of pixels of the current data unit using pixel values of the reference data unit, wherein the first prediction mode is a DC selection mode in which a mean value of horizontal and vertical lines included in two data units among the plurality of previous data units is determined and the similarity is determined by comparing the mean values of horizontal and vertical lines, wherein the plurality of previous data units includes a first data unit that is located on the left side of the current data unit, a second data unit that is located up from the current data unit, and a third data unit that is located on the upper left side of the current data unit, wherein in the determination of the reference data unit, if the first data unit and the third data unit are similar to each other, the second data unit is determined to be the reference data unit, and if the second data unit and the third data unit are similar to each other, the first data unit is determined to be the reference data unit, and wherein the similarity between the first data unit and the third data unit is determined by comparing a mean value of values of pixels included in the right-most line of the first data unit and a mean value of values of pixels included in the bottom-most line of the third data unit and the similarity between the second data unit and the third data unit is determined by comparing a mean value of values of pixels included in the bottom-most line of the second data unit and a mean value of values of pixels included in the right-most line of the third data unit.

12. A non-transitory computer-readable recording medium having recorded thereon a program for implementing a method for spatial predictive decoding of video data, the method comprising:

selecting a first prediction mode from a plurality of modes:

when a prediction is executed based on the selection of the first prediction mode, selecting for execution only one sub-mode from at least two sub-modes, said selecting of the sub-mode comprises:

determining similarity among a plurality of previous data units that are adjacent to a current data unit, according to a first prediction mode;

determining a reference data unit for spatial predictive encoding of the current data unit according to the determined similarity; and determining predicted values of pixels of the current data unit using pixel values of the reference data unit, according to the first prediction mode, wherein the first prediction mode is a DC selection mode in which a mean value of horizontal and vertical lines included in two data units among the plurality of previous data units is determined and the similarity is determined by comparing the mean values of horizontal and vertical lines, wherein the plurality of previous data units includes a first data unit that is located on the left side of the current data unit, a second data unit that is located up from the current data unit, and a third data unit that is located on the upper left side of the current data unit, wherein in the determination of the reference data unit, if the first data unit and the third data unit are similar to each other, the second data unit is determined to be the reference data unit, and if the second data unit and the third data unit are similar to each other, the first data unit is determined to be the reference data unit, and wherein the similarity between the first data unit and the third data unit is determined by comparing a mean value of values of pixels included in the right-most line of the first data unit and a mean value of values of pixels included in the bottom-most line of the third data unit and the similarity between the second data unit and the third data unit is determined by comparing a mean value of values of pixels included in the bottom-most line of the second data unit and a mean value of values of pixels included in the right-most line of the third data unit.

* * * * *